(No Model.) 3 Sheets—Sheet 1.

W. B. ELLIOTT & J. W. ESKHOLME.
DYNAMO ELECTRIC MACHINE AND ELECTRIC MOTOR.

No. 564,743. Patented July 28, 1896.

WITNESSES:
C. E. Ashley
H. W. Lloyd

INVENTORS:
William B. Elliott
John W. Eskholme.
By his Attorney (No Model.) 3 Sheets—Sheet 2.

W. B. ELLIOTT & J. W. ESKHOLME.
DYNAMO ELECTRIC MACHINE AND ELECTRIC MOTOR.

No. 564,743. Patented July 28, 1896.

WITNESSES:
C. E. Ashley
H. W. Lloyd

INVENTORS:
William B. Elliott
John W. Eskholme.
By his Attorney

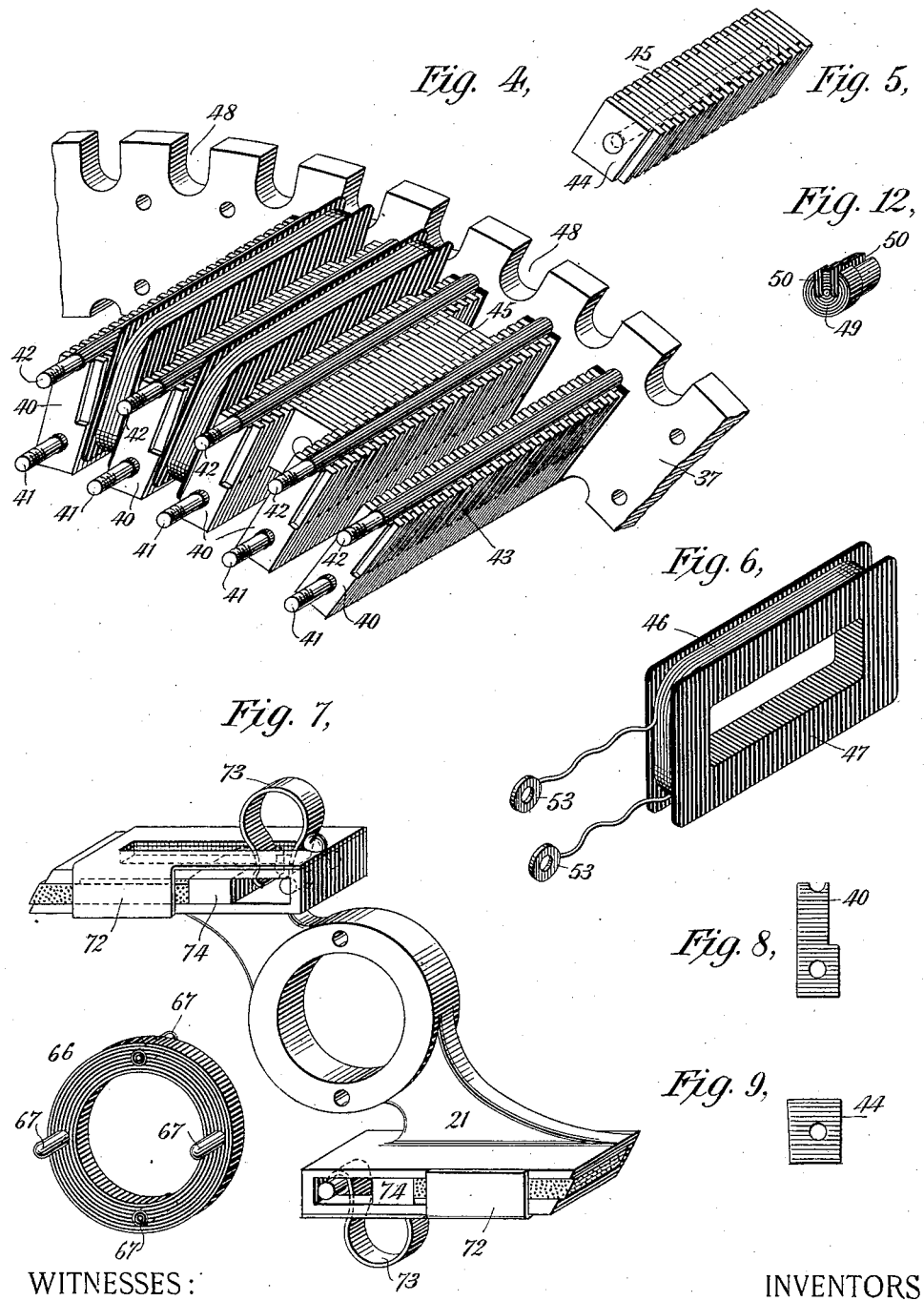

UNITED STATES PATENT OFFICE.

WILLIAM B. ELLIOTT AND JOHN W. ESKHOLME, OF WESTFIELD, NEW JERSEY.

DYNAMO-ELECTRIC MACHINE AND ELECTRIC MOTOR.

SPECIFICATION forming part of Letters Patent No. 564,743, dated July 28, 1896.

Application filed August 26, 1895. Serial No. 560,461. (No model.)

*To all whom it may concern:*

Be it known that we, WILLIAM B. ELLIOTT and JOHN W. ESKHOLME, citizens of the United States, and residents of Westfield, county of Union, and State of New Jersey, have invented certain new and useful Improvements in Electric Dynamos and Motors, of which the following is a specification.

Our invention, while relating to dynamo-machines and electric motors generally, has reference more particularly to that form of such machines in which a stationary armature built up or composed of detachable sections is employed in connection with rotating field-magnets, its object being to produce a machine of this class which, in addition to being more simple in construction and more efficient in operation than those heretofore in use, shall at the same time permit of the more ready removal and replacement of the armature coils and cores than has been possible with the machines hitherto employed.

To these ends the invention consists, first, in the peculiarities of construction of the cores for the armature-coils and in the supports in which they are secured; second, in the means whereby electrical connection is made between the field-magnet coil and the armature; third, in the peculiarity of construction of the brushes and brush-holders and in their arrangements with respect to the commutator; fourth, in the means employed for supporting the armature and other parts of the machine upon the base, whereby a partial rotation of such parts in one or the other direction may be effected as the removal of certain of the armature-coils may require, and, fifth, in various other constructions and combinations of parts, all as will be hereinafter more fully explained.

Our invention is illustrated in the accompanying drawings, in which—

Figure 1:
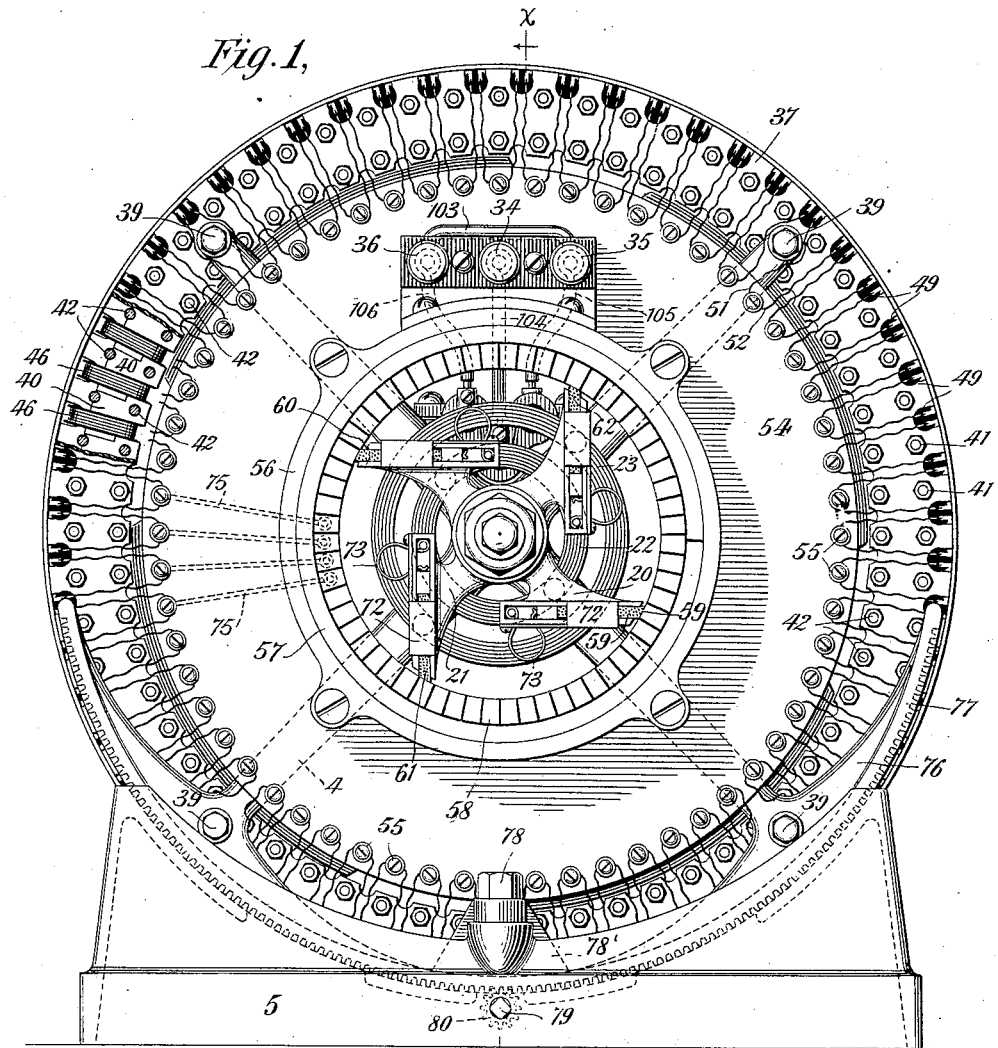
Figure 10:
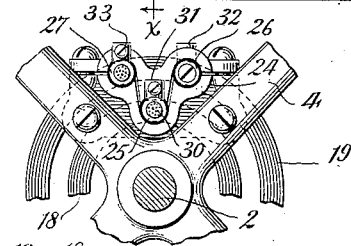
Figure 11:
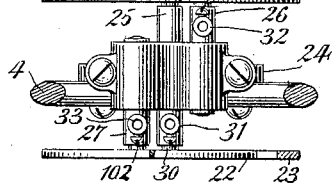
Figure 2:
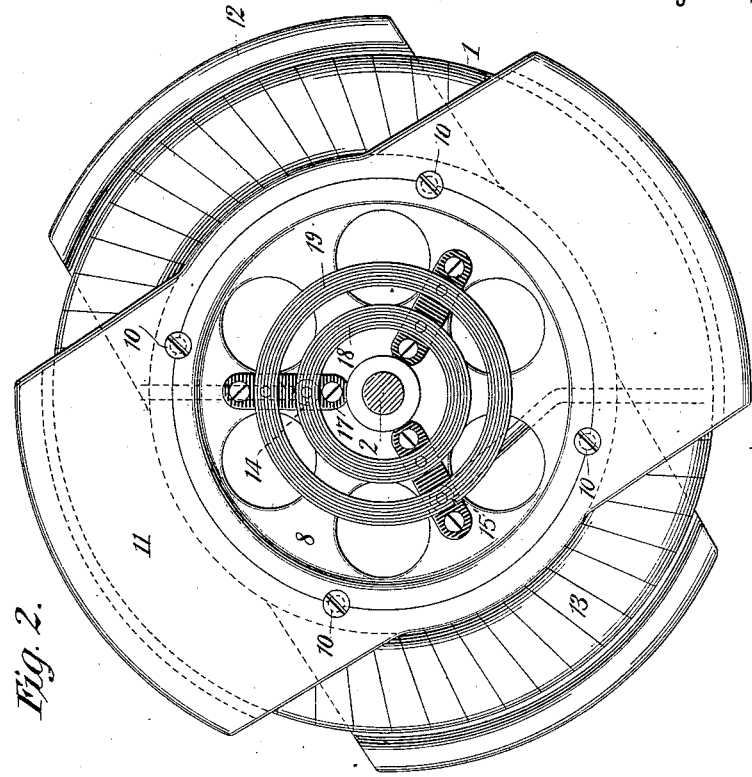
Figure 3:
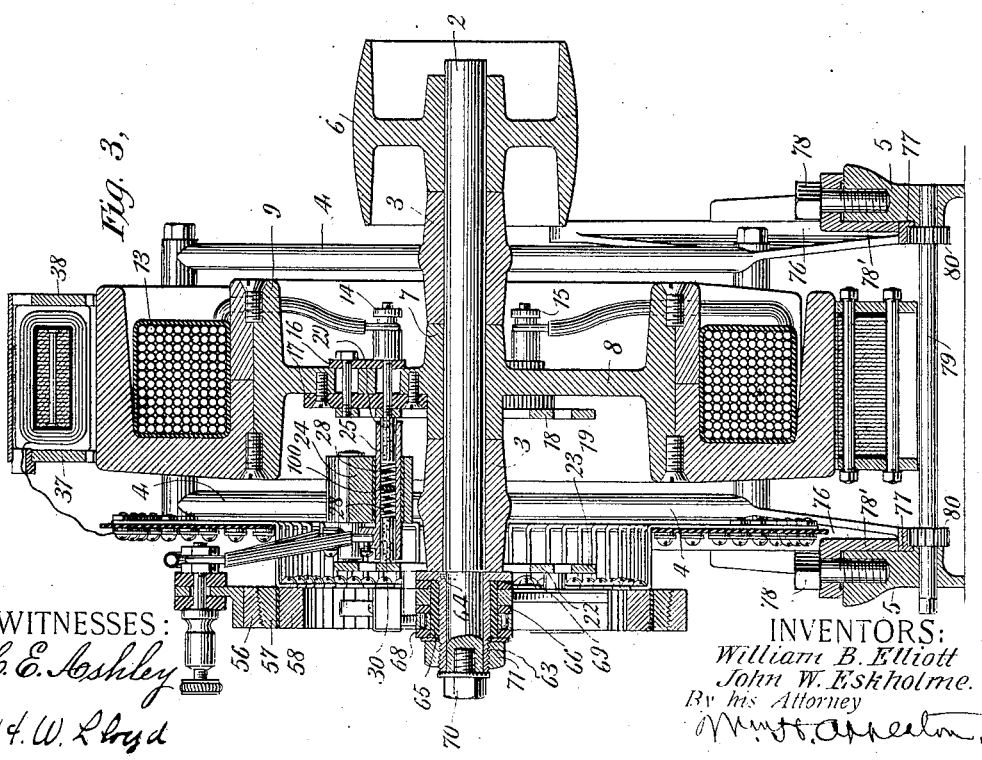

Figure 1 is an elevation of a dynamo-electric machine or electric motor constructed in accordance with our invention; Fig. 2, an elevation of the field-magnet thereof. Fig. 3 is a central vertical section of the entire machine, taken in the plane $x\,x$ in Fig. 1; Fig. 4, a perspective view of a portion of the built-up armature; Fig. 5, a perspective view of the core of one of the armature-coils detached; Fig. 6, a perspective view of one of the armature-coils also detached; Fig. 7, a perspective view of one of the brush-holders, showing also an insulating-ring provided with pins for securing the brushes together; Fig. 8, an elevation of one of the plates or laminæ forming a part of the segments which support the armature-coils in the armature; Fig. 9, a similar elevation of one of the plates or laminæ forming a part of the cores of the armature-coils; Figs. 10 and 11, a side elevation and plan, respectively, of the means made use of for forming the circuit connections between the moving and stationary parts of the machine; and Fig. 12, a perspective view of one of the insulating-plugs through which the wires from the armature-coils emerge from the side of the armature.

In all the figures like numerals of reference are employed to designate corresponding parts.

In the type of machine illustrated in the drawings the armature is stationary and the field-magnet rotates within the same.

We will describe the apparatus as a dynamo-electric machine, it being understood that the same apparatus is also capable of use as an electric motor.

The field-magnet of the machine is best shown in Figs. 2 and 3, taken in connection with Figs. 10 and 11. The field-magnet shown at 1 is mounted upon a shaft 2, which is adapted to rotate in bearings 3 3, forming the hubs of spiders 4 4, supported on the base 5 of the apparatus. The shaft 2 carries a driving-pulley 6, to which power is applied for operating the dynamo. Between the two hubs 3 3 is a sleeve 7, fixed to the shaft 2 and carrying a perforated disk 8, having a flattened rim 9. To this flattened rim are secured, by means of screws 10 10, the iron pole-pieces 11 12 of the field-magnet. These pole-pieces are arranged at right angles to each other and are offset, so as to bring their outer curved ends into the same plane of rotation.

The field-magnet coil is shown at 13, and at 14 and 15 are shown binding-posts, to which the emerging wires of the coil 13 are respectively connected. The binding-posts 14 15 are mounted on the disk 8, but insulated therefrom. By referring to Fig. 3 it will be seen that the binding-post 14, for example, passes through a strip 16, of hard rubber or other insulating material, thence through an opening in the disk 8, and thence through a strip 17, of hard rubber, beyond which it is connected with a ring 18, constituting the inner of two metallic rings secured upon, but insulated from, the disk 8. In a similar manner the binding-post 15 is secured to the outmost insulated ring 19.

Now at the forward end of the shaft 2 are mounted in a manner hereinafter to be described a pair of brush-holders 20 21, to which are respectively secured metallic rings 22 23, which correspond in relative size and position to the rings 18 and 19, already described. The corresponding rings of these pairs are connected together, electrically, by means shown more particularly in Figs. 3, 10, and 11. On one of the spiders 4 4 is mounted a plate or frame 24, through which pass insulated tubes 25 26 27. One of these tubes is shown in section in Fig. 3. Within it is a central disk 100, from which springs 28 28 press outward at both of its ends upon carbon contact-rods 29 30, and urging them against the rings 18 and 22, respectively. In this way the continuity of the electric circuit is maintained from the inner ring of one set to the inner ring of the other. On these tubes are binding-posts 31 32 33, connected, respectively, with the main binding-posts 34 35 36 of the machine through appropriate wires 104, 105, and 106, as shown.

It will be seen that the tubes 26 and 27 do not extend all the way across from one outer ring to the other; but the former, after contacting with ring 19 through a carbon contact 101, enters and is insulated from the frame 24, while the latter, after similarly contacting with the ring 23 through the carbon contact-rods 102, enters and is insulated from the said frame. By joining the two binding-posts 32 and 33 by means of a wire 103 the necessary connection between the rings 19 and 23 is completed.

We have now described the main features of the field-magnet of our apparatus. We come now to the armature. This is secured to the spiders 4 4 in proper relation to the rotating field-magnets by screws 39 39 and is composed of the two annular plates 37 and 38 and of the coils and cores 46 and 45, respectively, which are arranged between them. For supporting the coils and cores in proper position between the annular plates 37 and 38 the supports 43 are employed, which, extending across from one of such plates to the other, are severally made up from a series of plates or laminæ 40, arranged side by side. Each of these plates or laminæ is provided with a notch in its side, as shown more clearly in Fig. 8, and the series of plates or laminæ composing each of the supports 43 is strung upon an insulated rod 41 in such a manner as to present the notches in their edges on opposite sides of the axis of such rod, whereby to form along the sides of the support 43 a series of alternate tongues and notches extending downward across the sides of the same from their outer edges to points above their inner edges, where each of the notches affords a shoulder or an abutment, as shown more clearly in Fig. 4. In addition to the notch thus formed in the edge of each of the plates or laminæ 40 these plates or laminæ are each provided at its top or outer end with a semicircular notch, which is so disposed therein that when the series of plates or laminæ is arranged side by side on the insulated rod 41 to form one of the supports 43 these notches in all the plates or laminæ of the series will coincide and thereby form a channel of semicircular cross-section, in which rests the insulated rod 42 for preventing the movement of any of the plates or laminæ around the insulated rod 41. As thus constructed, the supports 43 are secured in place between the annular plates 37 and 38, and these plates firmly tied together by means of the insulated rods 41 and 42, which, passing through suitable orifices in said plates, are held therein by suitable heads and nuts, with which they are provided.

The several supports for the cores of the armature-coils, being constructed as above described, extend entirely around between the annular plates 37 and 38 at equal distances apart, and not only afford a space between the adjacent ones for such cores, but also tongued-and-notched walls for engagement with the corresponding tongued-and-grooved walls of said cores, the notch in the wall of one support being opposite the tongue of the opposite wall of the adjacent support, and vice versa.

The cores 45 for the armature-coils, like the supports therefor, are likewise made up from a series of plates or laminæ 44, one of which plates is shown detached in Fig. 9. These plates or laminæ are perforated at a point midway between the top and bottom, but away from or to one side of the middle point reckoned from side to side, and as thus formed a series of sufficient length to form one of the cores are arranged side by side and riveted together, as shown in Fig. 5. The plates or laminæ 44 in the completed core are alternated in position, the first one presenting its narrower side to the right of the rivet and the second its broader side, and so on. The core thus made up therefore as a whole presents an approximately smooth top and bottom, but is provided with tongued-and-grooved side walls corresponding to the tongued-and-notched walls of the supports 43, with which they engage. The core being constructed as thus explained will, when slid down in place between its two supports 43, engage with its tongued-and-grooved side walls with the tongued-and-notched walls of such supports, and cause an intimate union to be made between the three parts, the elements of the core making both end-to-end and side-to-side contact with the supports. Consequently the magnetic continuity of the armature-body is assured and the difficulties which might be expected to arise from the making of a built-up armature are obviated.

Before any given core 45 is put into place a coil 46, surrounding a suitable insulating supporting-frame 47, is set over it. The coil and its frame are not so wide as to interfere with the proper engagement of the cores and the adjacent supports.

At 48 48 in the annular plates 37 and 38 are shown some circular openings into which are set insulating-plugs 49 49, each provided with two slits 50 50, in which are adapted to lie the wires 51 and 52, the former being the end of a coil and the latter the beginning thereof. These ends are provided with washers 53 53, which are brought against the side of an insulating-disk 54, and secured to it and to each other by screws 55 55.

We now come to the commutator devices of our apparatus, which are arranged and constructed as follows:

To one of the spiders 4 is bolted a ring 56, into which is screwed a split ring 57. The latter ring supports within it (suitable insulations being interposed) the commutator-ring 58, which is or may be made up from the usual commutator bars or segments insulated from one another, as is common. Within the commutator-ring rotate the brush-holders 20 21, carrying the brushes 59 60 61 62. On the end of the shaft 2 a sleeve 63 is keyed by means of a pin 64. Outside the said sleeve is a ring 65 of insulating material, such as hard rubber, and this is itself surrounded by an insulating-ring 66, (see Fig. 7,) having pins 67 67, which enter the brush-holders 20 21, and hold them in the position to which they may be adjusted. The holders are also insulated by end rings 68 and 69 from the other parts of the apparatus. The sleeve 63 is held in place by a tap-screw 70, entering the end of shaft 2, and the brush-holders are held by a nut 71 on the end of the sleeve.

The shape of one of the brush-holders is shown in Fig. 7, the other being of corresponding shape, but offset so as to travel inside the commutator-ring and its holder, as shown in the said figure. As to the details of each of the brush-holders it will be seen that the carbon brushes are held in boxes 72 72, and that springs 73 73 are employed for furnishing the initial pressure and for cushioning the brushes under any sudden shock. The necessary pressure upon the brushes after the machine gets to running is designed to be supplied mainly by the centrifugal force of their rotation. It will be seen that the springs 73 act in the first instance upon metallic pieces 74 74 to press the latter against the carbon brushes by causing them to slide out in the boxes 72 of the brush-holder, as is done with the brushes by the action of centrifugal force thereon.

We show in dotted lines in Fig. 1 at 75, a few of the connectors from the armature-coil to the commutator bars or segments, which, connecting with the screws 55, lead to said bars or segments.

It is obvious that with an armature constructed as we have described any armature-section which may have received injury, or which for any reason it is desired to examine, test, repair, or replace, may be readily detached for that purpose, provided it resides in the upper part of the armature. In order to extend the benefits of our invention to all the coils of the armature, we supply a shoe 76, cast with the spiders 4 4 and provided with segmental racks 77 77. Normally this shoe is held fast to the base 5 by bolts 78 78 and clamps 78′ 78′. Under the rack is a shaft 79, carrying pinions 80 80, which engage with the racks and by means of which the spiders and the armature can be moved when the operator wishes to take out one of the lower armature-coils. The field-magnet, the armature, and the other parts coöperating with them, however, being all mounted upon the spiders 4 4, the base 5 is in no sense a necessity, but only a convenience, and may be dispensed with, leaving the entire operating parts of the apparatus to be supported from such spider, and in this way we contemplate sometimes using them.

Although in the foregoing we have described the best means contemplated by us for carrying our invention into practice, we wish it distinctly understood that we do not limit ourselves strictly thereto, but reserve to ourselves the right to modify the same in various ways without departing from the spirit thereof.

Having now described our invention and specified certain of the ways in which it is or may be carried into effect, we claim and desire to secure by Letters Patent of the United States—

1. An armature for dynamo-electric machines and electric motors, comprising, in its construction, a series of supports having tongued-and-notched side walls, and a series of coil-cores also provided with tongued-and-grooved side walls for engagement with the side walls of said supports, whereby the magnetic connection between them is established by end-to-end and side-to-side contacts, substantially as described.

2. An armature for dynamo-electric machines and electric motors the coils of which are provided with supporting-frames, and independent cores that are adapted for insertion in, and removal from, the coils and frames, substantially as described.

3. The combination, with the annular side plates of an armature of a dynamo-electric machine, and a series of supports secured between them and provided with notches in their side walls extending from their outer to points near their inner edges, of coils arranged between such supports and provided with cores which are constructed with tongues on their sides for engagement with said notches, whereby such coils and cores are securely held within the supports and their removal and replacement permitted without disturbing any of the other coils or cores, substantially as described.

4. A support for the core of an armature-coil made up of plates or laminæ notched on one side, and arranged side by side in an alternate reverse order, whereby such support is formed with tongued-and-notched side walls, substantially as described.

5. The combination, with a series of plates or laminæ notched on one side and arranged side by side in an alternate reverse order, of a rod upon which these plates or laminæ are supported and bound together and a support for the core of an armature-coil thereby formed having tongued-and-notched side walls, substantially as described.

6. A core for an armature-coil made up of plates or laminæ perforated eccentrically, and arranged side by side upon a rod in an alternate reverse order, whereby the side walls of such core are provided with tongues and grooves, substantially as described.

7. An armature for dynamo-electric machines and electric motors, consisting of two side plates or rings, a series of insulated rods connecting the said side plates or rings and supporting the supports for the cores of the armature-coils, which supports are provided with tongues and notches in their sides, suitable coils, and cores therefor which are also provided with tongues and grooves in their sides for engagement with the tongues and notches of the said supports, substantially as described.

8. The combination, in a dynamo-electric machine or electric motor, with two pairs of rotating concentric rings, of spring-contacts joining corresponding rings of the two pairs, substantially as described.

9. The combination, with a rotating field-magnet, and rotating brushes, of two pairs of concentric rings, one pair of which is secured to the magnet, and the other to the brushes, contacts for joining corresponding rings of the two pairs, suitable binding-posts, and electrical connections between the contacts and the binding-posts, substantially as described.

10. The combination, with a rotating brush-holder, and a brush arranged to slide loosely therein, of a stationary commutator surrounding the same, the said brush being moved outward in said holder and pressed against the inner wall of the said ring by centrifugal force due to its rotation, substantially as described.

11. The combination with a rotating shaft, and a brush-holder carried thereby and provided with a brush that is free to slide therein, of a commutator-ring surrounding the same, and a spring for moving the brush along the holder whereby such brush is held pressed outward against the interior of the commutator-ring, not only by spring-pressure, but also by centrifugal force, substantially as described.

12. The combination, with the armature, the field-magnet, the brush-holders, and connecting devices, of the spiders 4 4 in which these several parts are mounted and in and upon which they are supported and rendered capable of use independently of the base, substantially as described.

13. The combination, with an armature, and a supporting-base, of means for adjustably mounting the former upon the latter, whereby its position with respect to the base may be changed as a whole by rotation thereon, substantially as described.

14. The combination, with an armature having detachable sections, and a supporting-base, of toothed segments secured to said armature, and a shaft and pinions engaging with such toothed segments, whereby the armature may be partially rotated as a whole in one or the other direction when required, substantially as described.

15. The combination, with an armature having detachable sections, and a supporting-base, of a spider to which the armature is secured, provided with a toothed segmental shoe resting upon the base, a shaft, a pinion for engaging with such toothed shoe, and a bolt and clamp, whereby the armature may be partially rotated as a whole in one or the other direction when required, and then firmly clamped in place, substantially as described.

16. The combination, with an armature-supporting plate or ring provided with notches in its edge, and a series of armature-coils, of insulating-cores arranged in such notches, and provided with slits or grooves, substantially as described.

In testimony whereof we have hereunto set our hands this 24th day of August, 1895.

WILLIAM B. ELLIOTT.
    JOHN W. ESKHOLME.

Witnesses:
 N. H. DENNIS,
 L. M. WHITAKER.